United States Patent [19]

Fabbri

[11] Patent Number: 5,606,904
[45] Date of Patent: Mar. 4, 1997

[54] SYSTEM FOR THE SEMICONTINUOUS PRODUCTION AND FOR THE SALE FOR IMMEDIATE CONSUMPTION OF PRODUCTS SUCH AS PIZZAS, PIES AND THE LIKE

[76] Inventor: Lorenzo Fabbri, Via del Focardo No. 50/B, 50010 S. Donato in Collina, Rignano Sull'Arno, Firenze, Italy

[21] Appl. No.: 544,114

[22] Filed: Oct. 17, 1995

[30] Foreign Application Priority Data

Oct. 18, 1994 [IT] Italy ................. FI94A0191

[51] Int. Cl.⁶ .......................................... A23L 3/00
[52] U.S. Cl. .................. 99/326; 99/331; 99/386; 99/427; 99/443 C; 99/477; 126/21 A; 219/388
[58] Field of Search ............... 99/339, 340, 357, 99/400, 401, 423, 427, 446, 352–355, 386, 389, 443 R, 443 C, 473–479, 326–334; 126/21 A; 219/388, 400, 681, 701; 426/243, 523, 520, 466

[56] References Cited

U.S. PATENT DOCUMENTS

| | | | |
|---|---|---|---|
| 4,154,861 | 5/1979 | Smith | 99/477 X |
| 4,164,591 | 8/1979 | Ahlgren et al. | 99/386 X |
| 4,244,285 | 1/1981 | Baker | 99/339 |
| 4,338,911 | 7/1982 | Smith | 126/21 A |
| 4,382,403 | 5/1983 | Tokayer | 99/427 X |
| 4,389,562 | 6/1983 | Chaudoir | 219/388 |
| 4,655,126 | 4/1987 | Wells | 99/386 |
| 4,724,755 | 2/1988 | Escamilla | 99/443 C |
| 5,033,366 | 7/1991 | Sullivan | 99/357 X |
| 5,197,378 | 3/1993 | Scalise | 99/443 C |
| 5,231,920 | 8/1993 | Alden et al. | 99/443 C |
| 5,239,917 | 8/1993 | Lutkie et al. | 99/386 X |
| 5,309,824 | 5/1994 | Dromgoole et al. | 99/355 X |

FOREIGN PATENT DOCUMENTS

| | | |
|---|---|---|
| A1364343 | 4/1990 | European Pat. Off. . |
| A1482473 | 4/1992 | European Pat. Off. . |
| A2117972 | 11/1971 | Germany . |
| A2148615 | 6/1975 | Germany . |
| WOA19112597 | 8/1991 | WIPO . |

*Primary Examiner*—Timothy F. Simone
*Attorney, Agent, or Firm*—McGlew & Tuttle

[57] ABSTRACT

The system comprises in combination: a track (11, 111, 9, 113, 13) leading through a number of stations (3, 5, 7); at least one carriage (26) for supporting a tray unit (30) and traveling along said track; a preparation station (3) equipped with means (121) for laying out a layer of dough, and at which the preparation can be completed; a cooking station (5) with an oven through which said carriage (26) can pass and in which it can stop, with heating means (5B, 5C) and suitable control gear; a station (7) from which to serve the cooked product, generally by the portion; and means of returning the carriages to actuate successive cycles.

15 Claims, 8 Drawing Sheets

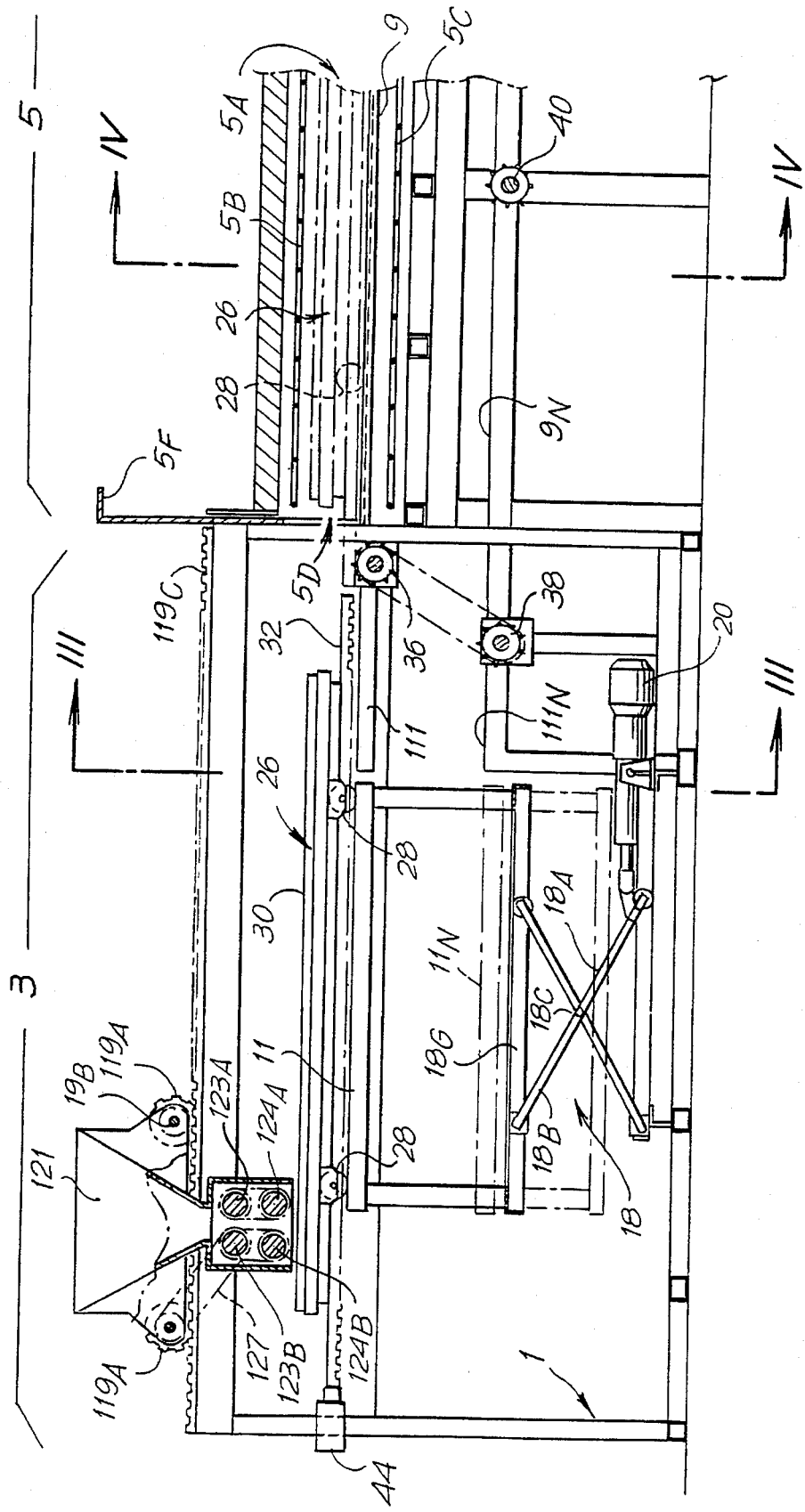

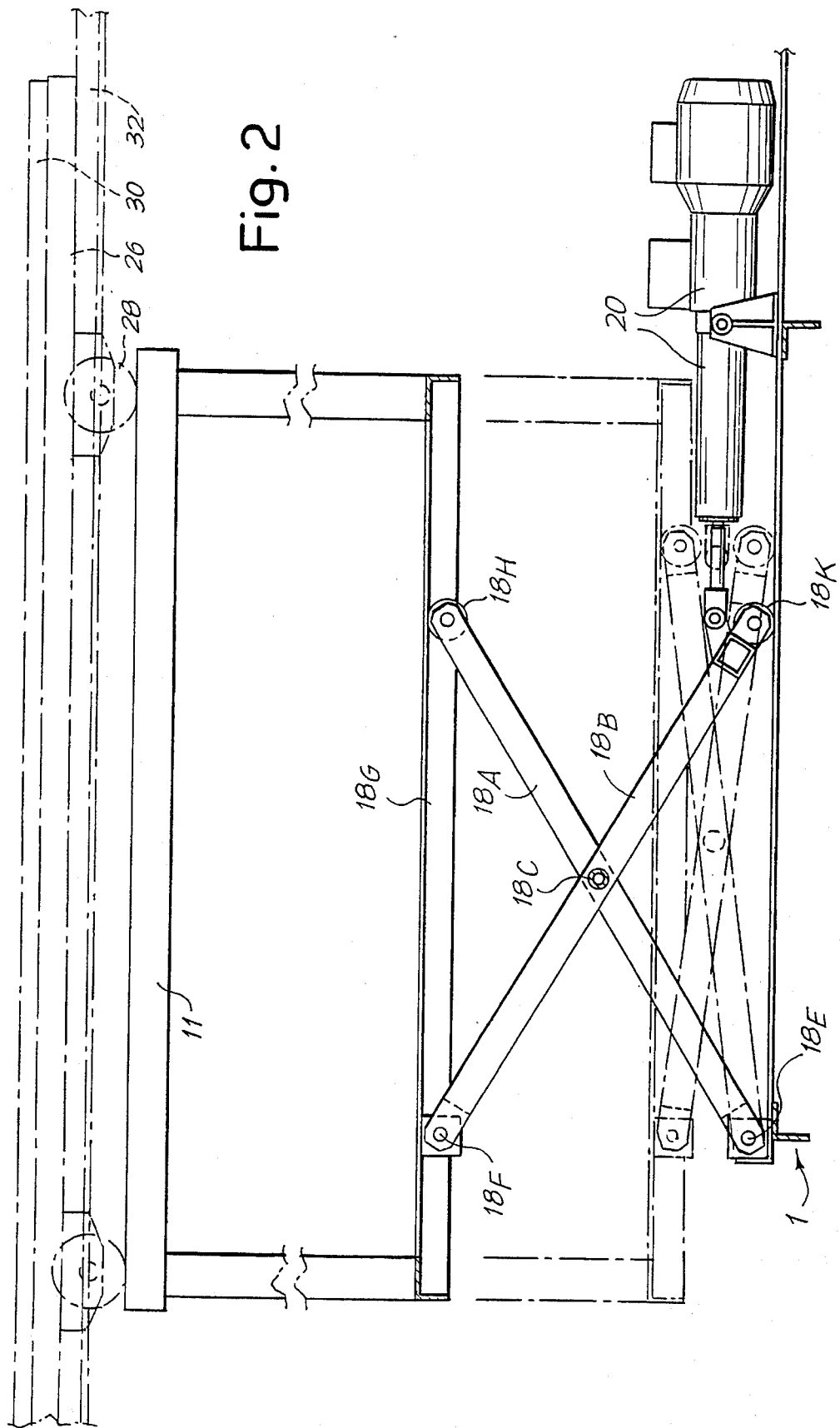

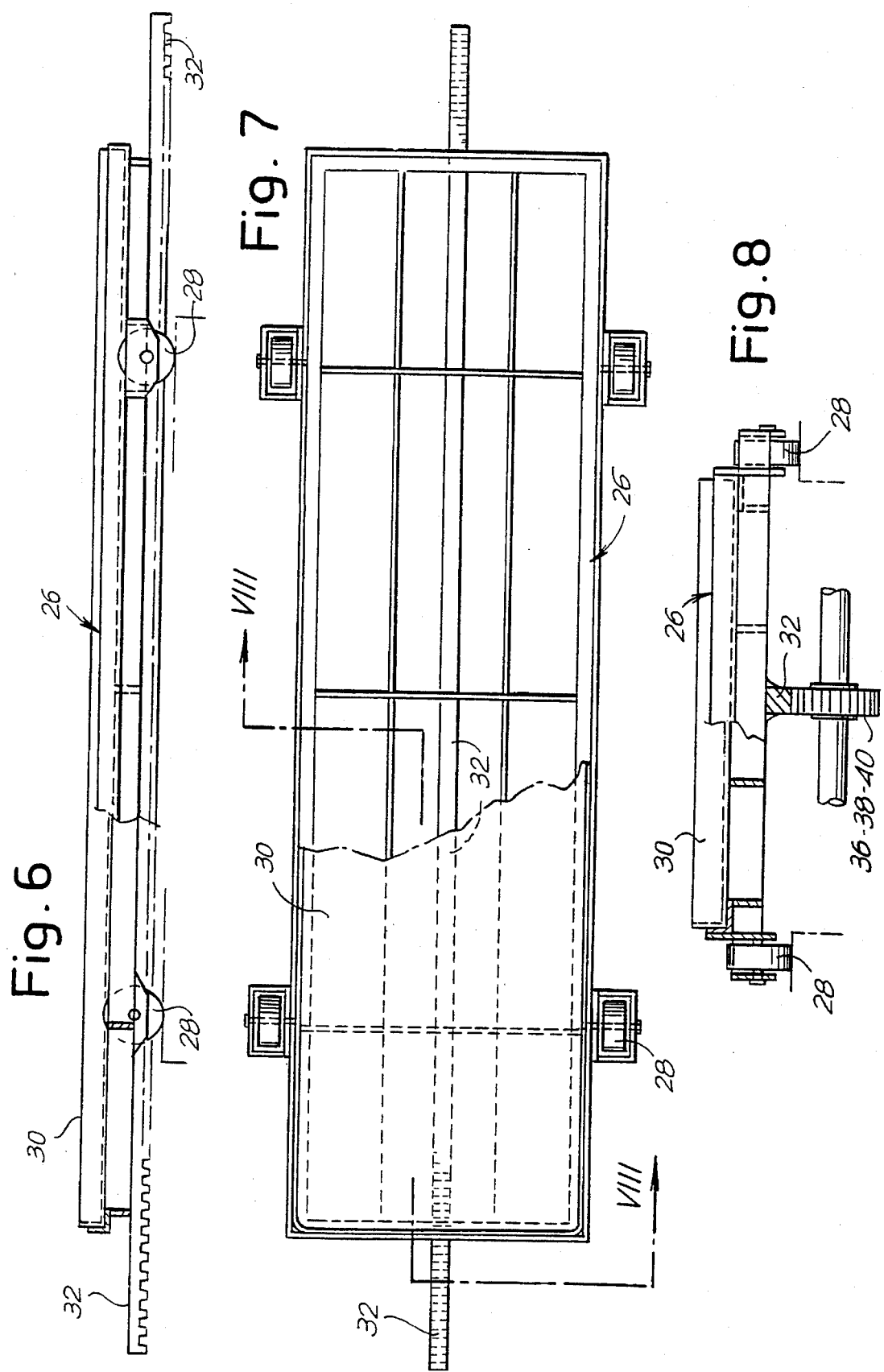

5,606,904

SYSTEM FOR THE SEMICONTINUOUS PRODUCTION AND FOR THE SALE FOR IMMEDIATE CONSUMPTION OF PRODUCTS SUCH AS PIZZAS, PIES AND THE LIKE

FIELD AND BACKGROUND OF THE INVENTION

DESCRIPTION

When producing pizzas or pies for selling by the portion it is important, if the product is to be fresh, that the latter be prepared and cooked close to the point of sale, at which point the product must also be kept at least at a gentle heat pending consumption. The product usually is prepared in trays which are moved by hand between a preparation area, a cooking area and the sales counter; for reasons of hygiene the preparation area is usually situated away from the sales area, a fact which complicates the moving of the trays by hand. This problem is aggravated by the temperature of the trays as they come out of the oven, and by the need, which is particularly irksome when sales are moving briskly, to carry the empty trays back from the sales counter to the preparation area.

SUMMARY AND OBJECTS OF THE INVENTION

In order to solve these problems, especially those relating to the moving of the trays by hand between the areas and returning the empty trays from the sales area to the preparation area, the system according to the present invention comprises in combination:

a track leading through a number of stations;

at least one carriage with a cooking surface for carrying a tray unit and traveling along said track;

a preparation station equipped with means for laying out a layer of dough, and at which the preparation can be completed on a tray unit;

a cooking station with an oven capable of containing the whole of said carriage, with heating means and suitable control gear;

a station from which to serve the cooked product, generally by the portion; and means for actuating successive cycles, with the trays being returned to the preparation station.

The preparation station may include a hopper-roller device, with means for producing relative movement between said device and the tray unit, so as to lay out the layer of dough; said device may be carried on a carriage-mounted structure to enable it to be moved over the tray unit, unless the mobility of the carriage with the tray is made use of as an alternative.

The oven advantageously comprises two doors, one at each end, to allow the carriage to enter the oven, stop inside it for the period necessary for cooking to take place, and pass on out.

In an advantageous embodiment, a tray unit is transferred for return purposes by means of systems for raising and lowering the outer portions from the tracks at both the preparation station and the serving station, an intermediate fixed portion of running track at the cooking station, and a return track underneath the cooking station. Means are provided for operating the raising and lowering systems of said outer portions of the running tracks.

The raising and lowering systems of the outer portions of the running tracks may include pantograph articulations.

For the purposes of moving the tray units it is possible to provide, on the carriages, rack bars, and, in fixed positions, driven gear wheels for meshing with said rack bar. The racks may be so shaped as to project longitudinally from the carriages, and three driven gear wheels may be provided along the return track, while level with the intermediate fixed portion of running track there are two driven gear wheels separated from each other by less than the length of the racks of the carriages. The preparation station may comprise an actuator for pushing the carriage toward the cooking station until it meshes with one of the two driven gear wheels level with the intermediate fixed portion of running track.

For the purposes of tray return, an alternative is to use a roller system for conveying the tray unit in an approximately vertical position; this roller system may comprise a fixed part alongside the cooking station, and two parts alongside the serving station and preparation station that can be raised angularly from an approximately vertical position to a position coplanar with the work surface, in order to enable the tray unit to be transferred from the work surface to the roller system and back again.

The tray may comprise intermediate dividing walls, in addition to its peripheral walls, which give the tray sufficient rigidity.

Other advantages, features and embodiments of the system according to the invention are defined in the appended claims.

BRIEF DESCRIPTION OF THE DRAWINGS

A better understanding of the invention will be derived from the description and accompanying drawing, the latter showing a practical nonrestrictive embodiment. In the drawing:

FIG. 1A is an enlarged detailed view of a portion of the system shown in FIG. 1;

FIG. 2 is a enlarged detailed view of a portion of the system shown in FIG. 1;

FIG. 6 is a side view showing in isolation a carriage;

FIG. 7 is a plan view showing in isolation a carriage; and

FIG. 8 is a detailed front view of the carriage.

DESCRIPTION OF THE PREFERRED EMBODIMENT

Figure 1:
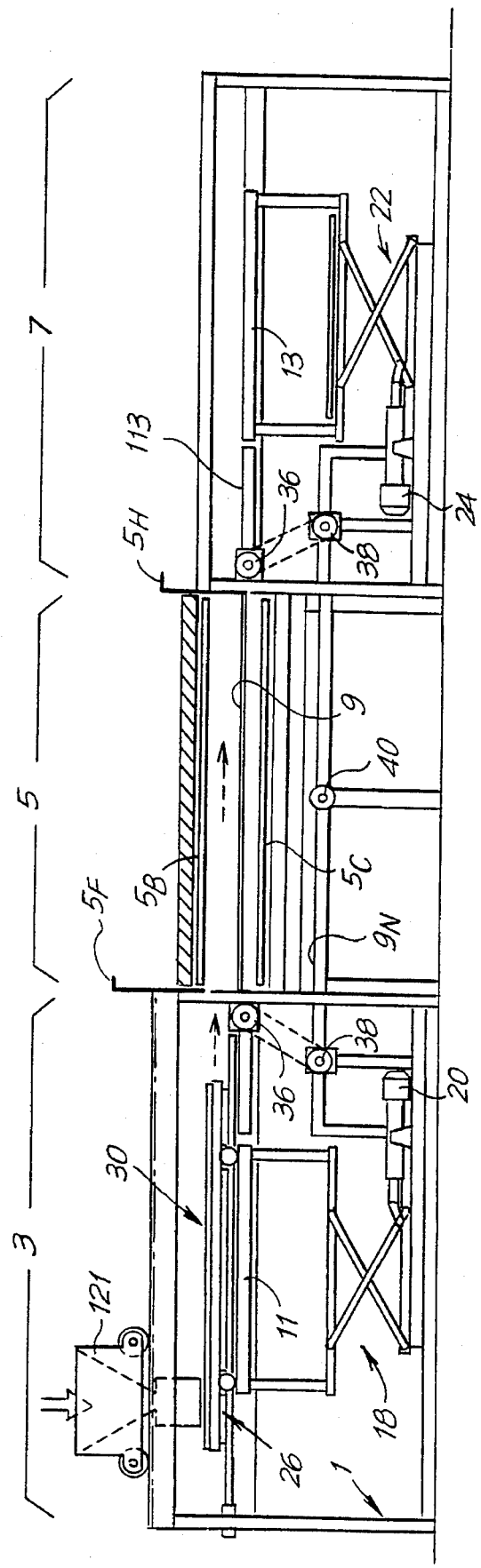
FIG. 1 is a longitudinal sectional view at parts of the system according to the invention.
Figure 1B:
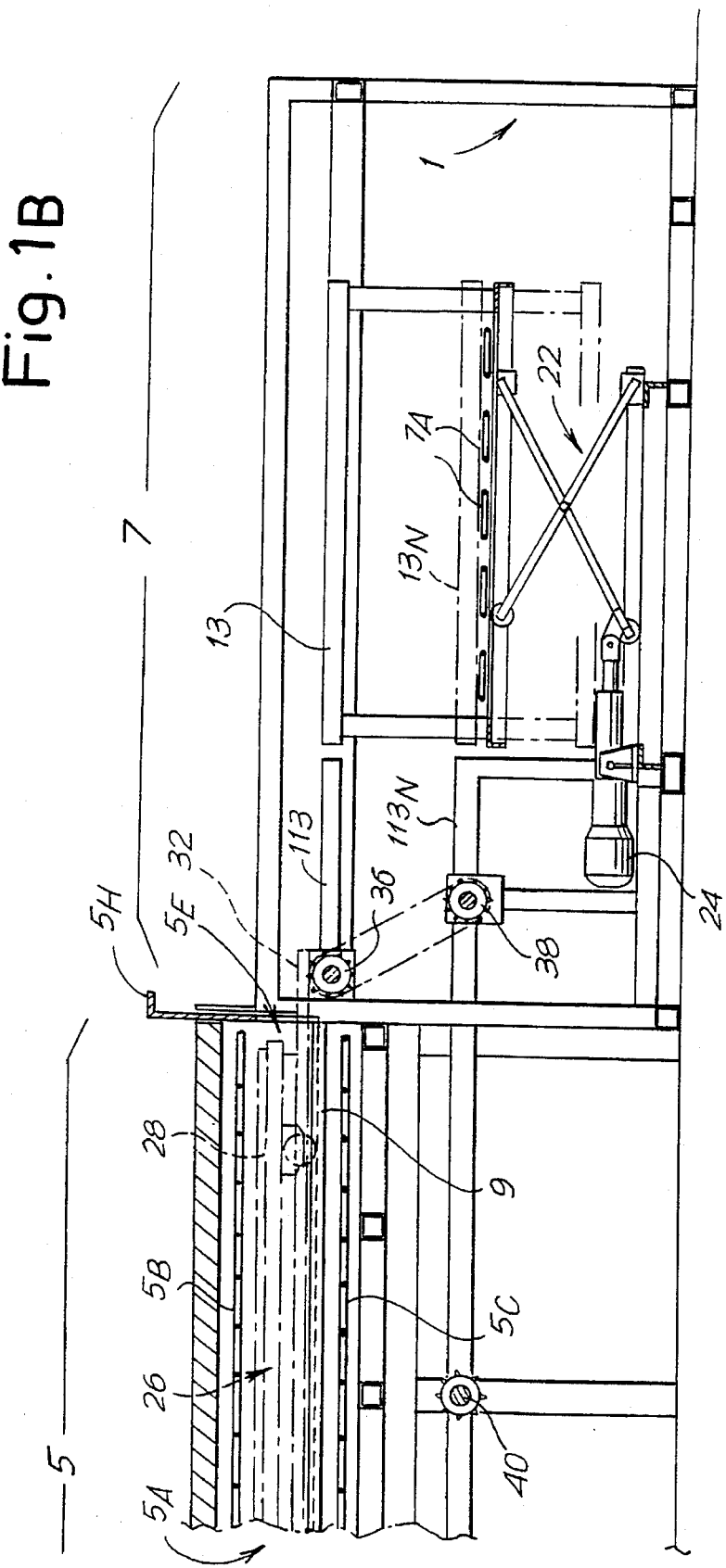
FIG. 1B is a enlarged detailed view of a portion of the system shown in FIG. 1.
Figure 3:
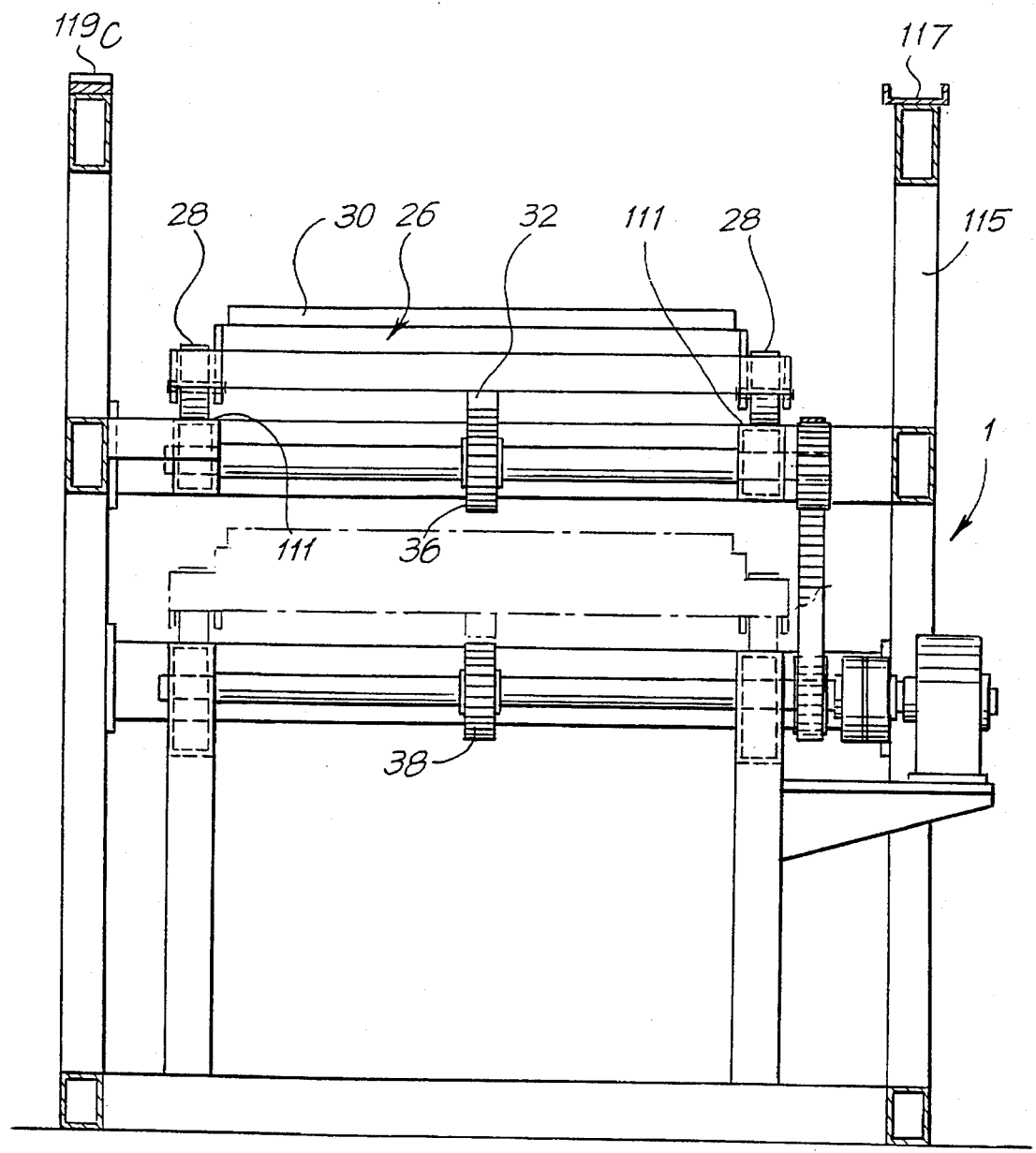
FIG. 3 is a sectional view taking along the cutting plane marked III—III in FIG. 1, at a different scale from FIG. 1.
Figure 4:
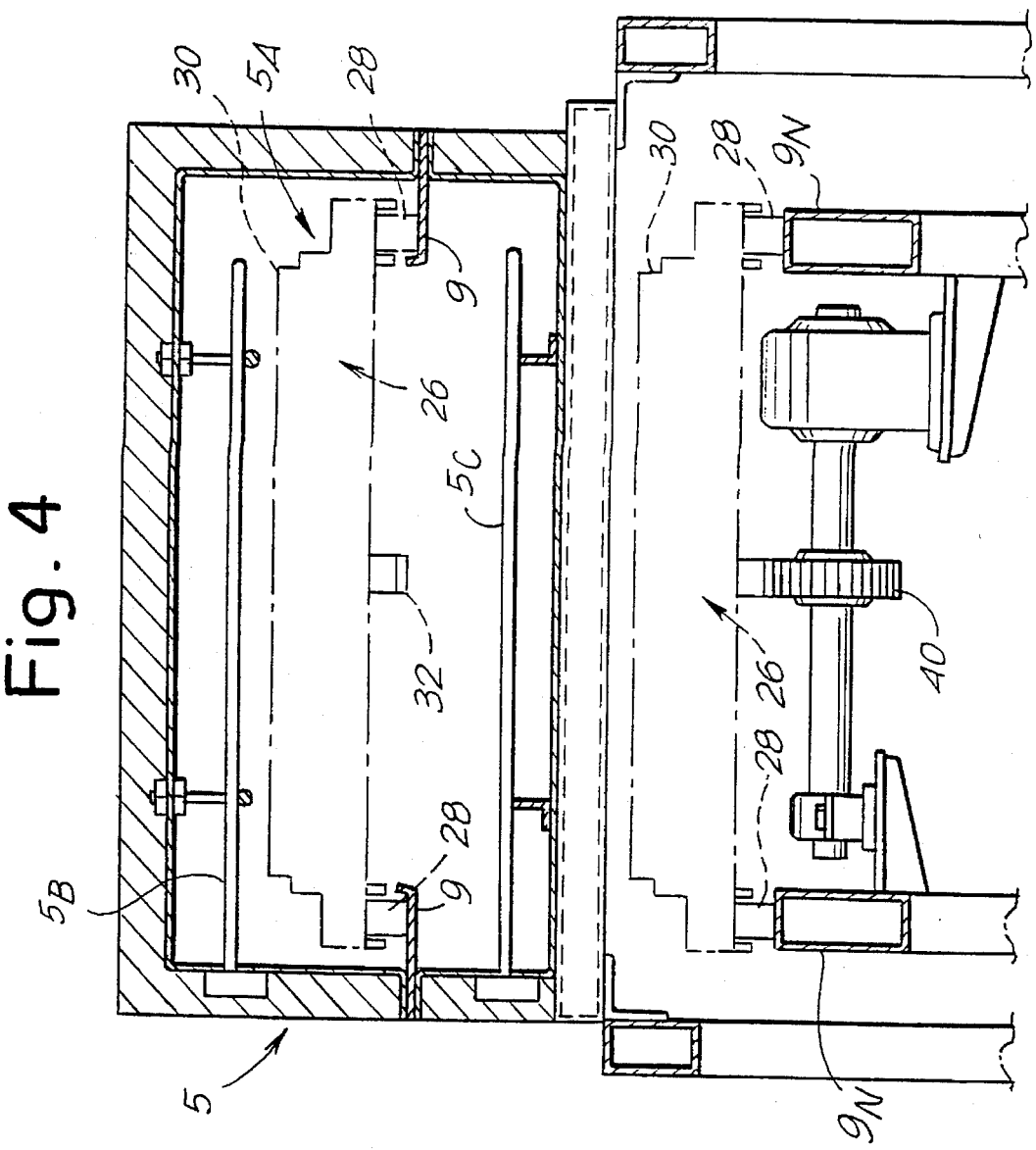
FIG. 4 is a cross-sectional view taken along the plane marked IV—IV in FIG. 1, at a different scale from FIG. 1.

Arranged in linear succession upon a base 1 constructed from metal sections are a preparation station 3, an intermediate cooking station 5 and a sales station 7. In plan view these stations are of approximately the same surface area.

A part of fixed straight rails 9 runs horizontally upon said base 1 for approximately the length of the intermediate cooking station 5. At stations 3 and 7 are pairs of rails 11 and 13, respectively, that can be raised and lowered; short fixed portions of rails 111 and 113 are provided adjacent to the rails 9. Taken as a whole, the rails 11, 111, 9, 113 and 13 form—when lined up with each other—a running track on which a carriage with a tray unit can be moved from station 3 to station 5 and from station 5 to station 7.

The preparation station 3 contains a system 18 for raising and lowering the rails 11; this system 18 is of an essentially pantograph design, having two frames 18A, 18B hinged together at 18C, hinged with fixed pivots 18E to the base 1, and hinged with fixed pivots 18F to an upper structure 18G carrying the rails 11; there are also rollers 18H for slidingly supporting the upper structure 18G and rollers 18K for sliding support the base 1. An actuator 20, acting between the base 1 and the part of the frame 18B to which the rollers 18K are fitted, can cause the rails 11 to descend from the upper level corresponding to that of the fixed rails 111, 9, 113, to a lower level marked 11N, corresponding with fixed portions of rails 111N, 9N, 113N; the rails 9N being situated underneath the rails 9. The actuator 20 can also bring about lifting by the opposite movement.

The sales station 7 contains a pantograph system 22 for raising and lowering the rails 13, exactly symmetrical to the system 18, with its own actuator 24. The rails 13 can thus be moved from the level corresponding to that of the fixed rails 9, 111 and 113 to the lower level marked 13N, which corresponds with the fixed portions of rails 113N, 9N, 111N.

With the arrangement described above it is possible to form an upper running track 11, 111, 9, 113, 13, and a lower running track for return purposes 11N, 111N, 9N, 113N, 13N, according as the rails 11 and 13 are raised and lowered. The upper running track is used for passing a tray from station 3 to station 5 and thence to station 7; the lower running track is used to return a tray from station 7 to station 3 by means of lowering, translation and raising.

These running tracks can carry at least two—or even three—carriages 26 with wheels 28, with each carriage supporting or holding a tray 30. Each carriage 26 has a rack bar 32 on its underside which engages with driven gear wheels to drive the carriage along. For the upper running track 11, 111, 9, 113, 13 there are two gear wheels 36 level with the fixed portions of rail 111 and 113 which form, with continuity, the ends of the fixed rails 9. For the lower running track (made up of the portions of rails 111N, 9N, 113N and rails 11 and 13 when lowered) there are three gear wheels 38, 40, 38; the wheel 40 is in an intermediate position level with the rails 9N while the two gear wheels 38 are level with the portions of rail 111N and 113N, but closer to rails 11 and 13 (when lowered to position 11N and 13N) than are the gear wheels 36.

When a carriage 26 is in station 3 on the raised rails 11, the rack is a slight distance away from the gear wheel 36, and in order to initiate movement toward station 5 a limited hand movement, or a push means generally marked 44, is applied until the rack 32 meshes with said wheel; the carriage can thus be passed by the gear wheels 36 to the cooking station 5, and—after a programmed stop for cooking—moved on to the sales station 7, at which point the rack just ceases to mesh with the gear wheel 36 nearest to station 7. When the tray on the carriage waiting at station 7 is to be returned to station 3, the actuator 24 is operated to lower the rails 13 to position 13N, in which the rack 32 meshes with the lower gear wheel 38; in accordance with a program, this wheel 38, the middle wheel 40 and the other wheel 38 act on the rack 32 in such a way as to return the carriage with the empty tray until the wheels 28 are on the lowered rails 11 in position 11N; after this the actuator 20 raises the rails 11 and the carriage to the same level as the rails 111 and 9 in the preparation station 3. It is possible during this cycle to have at least one other carriage making use of stopping positions on rails 9 and 9N out of phase with the other carriage.

The preparation station 3 comprises a frame 115 that supports runners 117 positioned above the rails 113, the runners 117 being parallel with the rails 11 and 9. A hopper 121 travels on wheels 119 along the runners 117 and is for containing a paste for preparing pizza or pie bases; this hopper 121 is equipped at its lower end with a first pair 123A, 123B of rolling cylinders and, beneath these, a second pair 124A, 124B of rolling cylinders, the rolling cylinders of each pair being connected to each other by gears 131 so that they turn at the same speed. The runners 117 are of sufficient length to enable the vertical plane of symmetry of said rolling cylinder unit to be moved along the entire length of the tray 13. One of the two cylinders 123A, 123B of the first pair of rolling cylinders is integral with a sprocket 125, which is connected by a chain or timing-belt drive 127 to a sprocket 129 coaxial and integral with the spindle of one 119A of said hopper wheels 119; the wheel 119A has teeth and meshes with a rack 117C. Said cylinder of the first pair is connected by a second chain or timing-belt drive 135 to one of the cylinders 124A, 124B of the second pair of rolling cylinders. The hopper and said rolling cylinders extend transversely relative to the runners 11, 9 and 117 over a width that is approximately equal to the internal width of the tray 30.

With this arrangement, and having selected suitable drive ratios for both said chain or timing-belt drives, a left-to-right movement of the hopper along the pair of runners 117 produces a corresponding rotation of said rolling cylinders, with the result that the paste contained inside the hopper is fed down onto the tray 30 below and a uniform thickness of the paste is laid over the whole surface of the tray. The wheel 119A which produces the rotation of the rolling cylinders advantageously has teeth meshing with a rack 119C situated along the runner 117C corresponding to said wheel, in such a way that the advancing of the hopper and the turning of the rolling cylinders can occur without relative slip.

It is advisable not to allow the initial portion of dough rolled out irregularly by the rolling device to be used. It is possible for this purpose to have a motor means M for the rolling device, and in the drive to the wheels 119 for the movements of the hopper 121 a clutch to connect the drive after an initial operation of the rolling cylinders.

Once the preparation of the pizza or pie is complete, with whatever toppings and seasonings may be required on top of the rolled dough, the tray 30 containing the dough is passed along on the carriage 26 from the preparation station 3 to the cooking station 5. The latter comprises a tunnel oven 5A defined at the top and sides by refractory walls, and has electrical heating elements 5B, 5C inside the cooking chamber above and below the carriage 26 when the latter is in position inside the cooking station 5. The runners 9 pass longitudinally through the cooking chamber and the latter's end apertures 5D, 5E can be closed by respective doors 5F, 5H which may either slide vertically or be lifted angularly.

When cooking is finished, the pizza or pie is passed out with its tray 30 and carriage 26 to the sales station 7, the wheels 28 being on the raised rails 13. Here the pizza or pie is served and if required cut into individual pieces, if it is not already in the form of ready-shaped products. The tray remains in the sales station 7 at least until it has been cleared, and the sales station 7 is equipped with electrical heating elements 7A in order to keep the pizza or pie at a gentle heat.

For the purposes of return, the carriage is lowered with the rails 13, passed along the rails 13N, 9N and 11N, and raised again in station 3.

During the period when the tray 30 is waiting in the sales station 7, a new pizza or pie can be prepared and cooked and to this end another carriage 26 can be positioned when required in the preparation station 3 and in the cooking station 5. It is even possible to use a third carriage, passing it through a third cycle out of phase with the cycles of the two aforesaid carriages.

The various sequences of moving and operating can be programmed to a greater or lesser degree.

Each tray 30 can be divided up with intermediate walls that strengthen it and allow the contents to be separated into different areas, which can thus also be given seasonings of different flavors. It is even possible to have, for example, four smaller trays resting on or fixed to a frame and handled as a unit like the tray 30: they would have sharp corners for easy cleaning. The trays can be periodically removed from the carriages for cleaning and replaced with spare trays.

Figure 5:
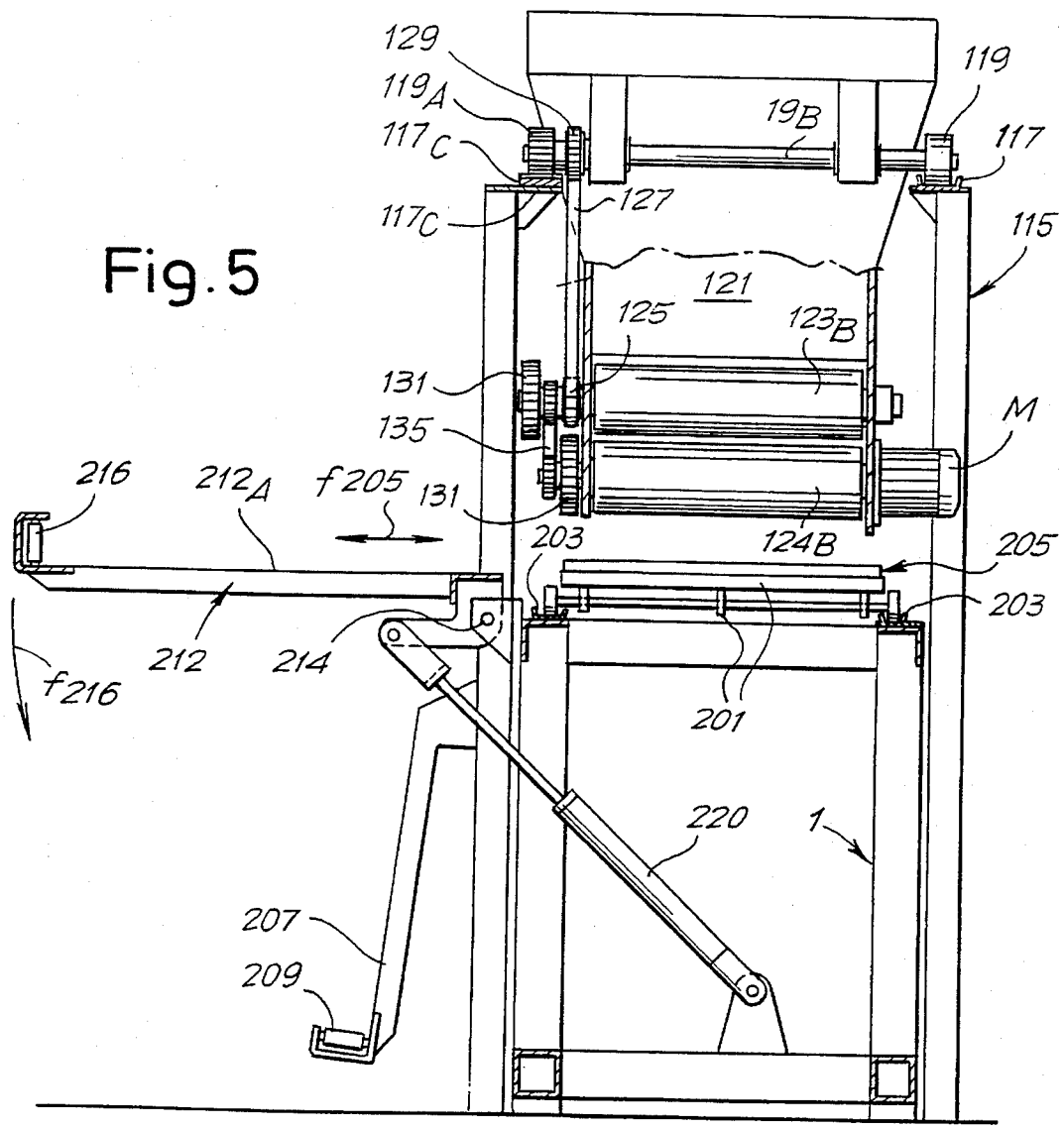
FIG. 5 is a sectional view through a laying-out system and a bottom and alternative embodiment.

In the alternative partly illustrated in the lower part of FIG. 5, a carriage 201 moves on rails 203 extending through the three stations of preparation, cooking and serving. The carriage 201 supports a tray 205, which can be moved transversely to the direction of the rails 203, that is in the direction of the double arrow f205. Alongside the intermediate cooking station is a fixed structure 207 supporting a roller system 209. Alongside the preparation station and alongside the serving station there are two supporting structures 212 that can be moved about an axis 214 parallel with the rails 203. Each structure 212 carries a roller system 216 and forms a running surface 212A which—when the structure 212 is raised to the horizontal—can support the tray 205, which can be moved from the carriage 201 onto said surface 212A and back again. When the structure 212 is lowered in the direction of the arrow f216 about the axis 214, the roller system 216 lines up with the fixed roller system 209. Consequently a tray 205 on the carriage 201 situated in the serving station can be moved out onto the surface 212A and then lowered into an approximately vertical position so that it rests on the roller system 216; the tray can then be passed over the three roller systems 216, 209, 216 until it comes alongside the preparation station, raised by the structure 212 with which this station is fitted, and pushed horizontally back onto a carriage 201 situated in said preparation station.

Actuators 220 can be provided for raising and lowering the two structures 212.

It will be understood that the drawing shows only an illustrative embodiment purely by way of a practical demonstration of the invention, it being possible for the invention to be altered in its shapes and arrangements without thereby departing from the scope of the concept underlying said invention. The presence of any reference numerals in the accompanying claims is purely for the purpose of facilitating the reading of the claims with reference to the description and to the drawing, and does not limit the scope of protection represented by the claims.

I claim:

1. A system for the semicontinuous production and for the sale for immediate consumption of products made with one of raised doughs, short doughs, pastas and other, comestibles, generally served by the portion, comprising:

a plurality of stations;

a track leading through said stations;

a carriage traveling along said track, said stations including;

a preparation station equipped with means for laying out a layer of dough, said preparation station for completing a preparation stage,;

a cooking station including an oven with an oven space, said oven space being large enough to contain said carriage, said oven including heating means for heating said oven space and including control means for controlling said heating; and a serving station for serving one of a cooked product, and a portion of a cooked product;

a tray unit carried by said carriage; and subsequent cycle actuation means for returning said tray unit from said serving station to said preparation station and for actuating a subsequent cycle of passing through said stations.

2. A system according to claim 1, wherein said preparation station includes:

a hopper-roller device including relative movement means for producing relative movement between said hopper-roller device and said tray unit for laying out a layer of dough; and dispensing means for dispensing irregularly rolled out dough and discarding said irregularly rolled dough prior to initiation of said laying out movement.

3. A system according to claim 2, further comprising a frame with rails and wheels for carrying said hopper-roller device whereby said hopper-roller device is moved over said tray unit, in the same direction as the track or at right angles to said track.

4. A system according to claim 1, wherein said oven includes two doors, one of said two doors at each of two ends of said oven, whereby said carriage may enter said oven through one of said two doors, stop for cooking and pass on out of said oven through another of said two doors.

5. A system according to claim 1, wherein said subsequent cycle actuation means includes a return track means for returning a tray unit from the serving station to the preparation station.

6. A system according to claim 5, wherein said subsequent cycle actuation means includes raising and lowering means for raising and lowering outer portions of said track at said preparation station and at said serving station, said return track means including an intermediate fixed portion of running track at and underneath said cooking station.

7. A system according to claim 6, wherein said raising and lowering means includes pantograph articulations.

8. A system according to claim 7, further comprising longitudinal rack bars on said carriages, for moving said tray units, and, in fixed positions, driven gear wheels for meshing with said rack bar.

9. A system according to claim 8, wherein said rack bars project longitudinally from said carriages and said driven gear wheels include three driven gear wheels provided along said return track means and two driven gear wheels separated from each other by less than the length of said rack bars and level with said intermediate fixed portion of running track.

10. A system according to claim 9, further comprising actuator means, at said preparation station, for pushing said carriage toward said cooking station until it meshes with one of said two driven gear wheels.

11. A system according to claim 1, wherein said subsequent cycle actuation means includes a roller system for conveying said tray unit in an approximately vertical position, said roller system including a fixed part alongside said cooking station and two movable parts, including a movable part alongside said serving station and a movable part alongside said preparation station, said movable parts being raised angularly whereby said tray unit is moved horizontally and transversely.

12. A system according to claim 1, wherein said tray is divided up with intermediate walls.

13. A system according to claim 1, wherein said intermediate walls form strengthening members.

14. A system for the semicontinuous production and for the sale for immediate consumption of products made with one of raised doughs, short doughs, pastas and other, comestibles, generally served by the portion, comprising:

a plurality of stations;

a track leading through said stations;

a carriage traveling along said track, said stations including;

a preparation station equipped with means for laying out a layer of dough, said preparation station for completing a preparation stage;

a cooking station including an oven with an oven space, said oven space being large enough to contain said carriage, said oven including heating means for heating said oven space and including control means for controlling said heating; and a serving station for serving one of a cooked product, and a portion of a cooked product;

a tray unit carried by said carriage; and subsequent cycle actuation means for returning said tray unit from said serving station to said preparation station and for actuating a subsequent cycle of passing through said stations including a return track means for returning a tray unit from the serving station to the preparation station and raising and lowering means for raising and lowering outer portions of said track at said preparation station and at said serving station, said return track means including an intermediate fixed portion of running track at and underneath said cooking station.

15. A system for the semicontinuous production and for the sale for immediate consumption of products made with one of raised doughs, short doughs, pastas and other, comestibles, generally served by the portion, comprising:

a plurality of stations;

a track leading through said stations;

a carriage traveling along said track, said stations including;

a preparation station equipped with means for laying out a layer of dough, said preparation station for completing a preparation stage,;

a cooking station including an oven with an oven space, said oven space being large enough to contain said carriage, said oven including heating means for heating said oven space and including control means for controlling said heating; and a serving station for serving one of a cooked product, and a portion of a cooked product;

a tray unit carried by said carriage; and subsequent cycle actuation means for returning said tray unit from said serving station to said preparation station and for actuating a subsequent cycle of passing through said stations and including a roller system for conveying said tray unit in an approximately vertical position, said roller system including a fixed part alongside said cooking station and two movable parts, including a movable part alongside said serving station and a movable part alongside said preparation station, said movable parts being raised angularly whereby said tray unit is moved horizontally and transversely.

* * * * *